(No Model.)  6 Sheets—Sheet 1.

T. MESSENGER.
PEAT MACHINE.

No. 423,261.  Patented Mar. 11, 1890.

Witnesses
H. A. Lamb
Alex. Scott

Inventor
Thomas Messenger
By his Attorney
Frankland Jannus (No Model.) 6 Sheets—Sheet 2.

T. MESSENGER.
PEAT MACHINE.

No. 423,261. Patented Mar. 11, 1890.

Witnesses
H. H. Lamb
Alx. Scott

Inventor
Thomas Messenger
By his Attorney
Frankland James (No Model.)

T. MESSENGER.
PEAT MACHINE.

Patented Mar. 11, 1890.

Witnesses
H. A. Lamb
C. S. Sturtevant

Inventor
Thomas Messenger
By his Attorney
Frankland Jannus (No Model.)　　　　　　T. MESSENGER.　　　　6 Sheets—Sheet 4.
PEAT MACHINE.

No. 423,261.　　　　　　　　　Patented Mar. 11, 1890.

Witnesses　　　　　　　　　　　　　Inventor
H. A. Lamb　　　　　　　　　　Thomas Messenger
C. L. Sturtevant　　　　　　By his Attorney
　　　　　　　　　　　　　　Frankland Jannus (No Model.) 6 Sheets—Sheet 5.

T. MESSENGER.
PEAT MACHINE.

No. 423,261. Patented Mar. 11, 1890.

Witnesses
H. A. Lamb
C. L. Sturtevant

Inventor
Thomas Messenger
By his Attorney
Frankland Jannus (No Model.)  6 Sheets—Sheet 6.

T. MESSENGER.
PEAT MACHINE.

No. 423,261. Patented Mar. 11, 1890.

Witnesses
H. A. Lamb
Chas. L. Sturtevant

Inventor
Thomas Messenger
By his Attorney
Frankland James

UNITED STATES PATENT OFFICE.

THOMAS MESSENGER, OF DOVER, COUNTY OF KENT, ENGLAND.

PEAT-MACHINE.

SPECIFICATION forming part of Letters Patent No. 423,261, dated March 11, 1890.

Application filed March 12, 1888. Serial No. 266,963. (No model.) Patented in England February 15, 1888, No. 2,293.

*To all whom it may concern:*

Be it known that I, THOMAS MESSENGER, a subject of the Queen of England, residing at Dover, in the county of Kent and Kingdom of England, have invented a new and useful Machine for Compressing Substances into Convenient Forms, (for which I am applying for Letters Patent in Great Britain, No. 2,293, and dated February 15, 1888,) of which the following is a specification.

The present invention is an improved machine for compressing substances into convenient forms, and is designed particularly for use in compressing matter suitable for fuel into pellets, balls, bricks, or other convenient shapes. Its object is to provide a machine which shall simultaneously perform the operations of filling, compressing, and ejecting the substances under treatment.

The invention consists, broadly, of a main shaft, a die-carrying shaft operated intermittently therefrom, plungers connected to said main shaft and operated thereby for compressing the material in the die, a pawl for locking said die after each intermittent movement, and means for operating said pawl.

Further, the invention consists in various details of construction and arrangement of parts, all hereinafter fully described and specifically claimed.

My invention is illustrated in the accompanying drawings, in which—

Figure 1 is an elevation of my improved machine; Fig. 2, a plan. Fig. 3 is an elevation at one end. Fig. 4 is a sectional elevation through the die. Fig. 5 is a sectional elevation at the end opposite that shown in Fig. 3. Figs. 6, 7, 8, 9, 10, and 11 are detail views showing the positions of the plungers at different portions of the stroke, the relative positions of the die and locking-pawls being shown in elevation at the right of each of said figures, except Fig. 11. Fig. 12 is an elevation similar to Fig. 1, but at a different portion of the movement of the machine. Figs. 13 and 14 are cross-sectional views of the machine, taken at different portions of its movement. Fig. 15 is a sectional elevation showing the plungers at their extreme outward stroke. Fig. 16 is a plan of same. Fig. 17 is a sectional elevation showing the plungers at their extreme inward stroke. Fig. 18 is a plan of same.

In the drawings, B is the main shaft of the machine, to which power is applied in any well-known manner.

A A' are two eccentrics fixed in said shaft, one of them A being coupled to the lever C, suitably pivoted to the frame of the machine. The lever C is connected at its upper end to a sliding head, in which is secured plungers F F', fitting into openings in a revolving die G. The eccentric A' is coupled to pivoted levers D, E, and E', which operate plungers F F' F$^2$, respectively, which also work into openings in the die G.

The die G is rigidly attached to a suitable shaft, and has an intermittent revolving motion imparted to it, which is effected as follows: H is a crank-pin attached to the main shaft B of the machine. To this crank-pin is attached at one end a rod I, pivoted at its other end to a toothed sector J, which meshes with a second toothed sector K. In operative relation with this sector K is a ratchet L, actuating a shaft, upon which is a bevel-wheel M, meshing with a second wheel M, on the die-carrying shaft. It will thus be seen that by means of the connections described intermittent movement will be imparted to the die, the ratchet preventing any reverse movement of the shaft during one portion of the movement of the crank H, rod I, and sector J.

Q is a hopper for supplying material to the apparatus.

The die G, as above stated, contains three holes for receiving the material to be compressed, the plungers F F, F' F', and F$^2$ successively entering each of said holes, the plungers F F acting as fillers, F' F' as compressors, and F$^2$ as an ejector, the movements of the apparatus being so timed that the plungers all move forward at the moment the intermittent revolution of the die is completed. This die G has three lugs formed around its periphery at equal distances apart, so that it may be locked by suitable pawls N N', now to be described.

N is a spring-pawl normally in engagement with the die G, and adapted upon the completion of one of the intermittent movements of the said die to bear against one of the lugs thereon, and thus prevent any rebound of said die. Upon its opposite side the die is locked from any movement due to momentum or overrunning after the completion of its intermittent movement by means of the pawl N'. This pawl is operated in the following manner. It is secured to a shaft, upon which is formed a bevel-wheel P. This wheel P meshes with another wheel P, secured to an arm journaled in a suitable bearing and rigidly attached to a lever O and extending at right angles thereto. The lower part of this lever O is slotted, the slot being in engagement with the crank-pin H, heretofore referred to. The lever O thus vibrates back and forth, and as it vibrates through the arms and wheels P the pawl N' is moved toward or away from engagement with the lugs on the die, the movement of these parts being performed in proper relation to the movements of the die-carrying shaft and plungers.

Referring now more particularly to the detail views, Fig. 6 I have taken as showing the commencement of the cycle of mechanical movements. It shows the plungers at half-stroke going outward, the die being about to move, and all being clear of the die G. At this instant the crank-pin H, which operates this die, is relatively at right angles to the center of eccentrics, and therefore just passing its center. This die G is therefore, by means of the ratchet L, just commencing its intermittent movement, and the locking-pawl N', operated by the crank-pin H, also being clear to allow the die to revolve.

Fig. 7 shows the plungers at their extreme outward stroke, the eccentrics having made one-fourth of a turn and the die G still moving, having completed half its intermittent movement. The pawl N' is now moving toward the die to meet the approaching lug on the die.

Fig. 8 shows the plungers at half-stroke going inward and about to enter but still clear of the die, (die just stopped;) but during this time as the eccentrics have made half a turn the crank-pin H has also done the same and is again on its center. Therefore the die has come to rest, and by means of the ratchet remains at rest during the next half-revolutions of the eccentrics; and as the pawl N' is also operated from the crank-pin H and has come to rest at the same instant in its inward position, (meeting one of the lugs on the die,) and thus locking the die from the possibility of any further movement in one direction, while the pawl N, in itself automatic, has dropped into gear with another lug and so prevented the possibility of the die moving in the other direction, it is now therefore securely fixed in the proper position for the plungers to enter their respective holes.

Fig. 9 shows the eccentrics have now made three-fourths of a revolution; the plungers have all completed their inward stroke, die stationary; the filling plungers F F having filled and partly compressed the material, the compressing-plungers F' F' having done the compression and the ejecting-plunger F² having ejected the compressed substance. The pawl N', by means of its connection with the crank-pin H, is now receding from the die and thereby unlocking it.

Fig. 10 shows the plungers again at their half-stroke going outward all clear of the die and the die about to move. The eccentrics have now completed one revolution, and this time the crank-pin H is again passing its center, as described in Fig. 6, and the die, after having remained at rest during one half-revolution of eccentrics, is again in position to commence its intermittent movement in order to bring each hole in its proper position for the operations to be repeated, the pawl N' being all clear to allow this, and this completes the cycle of mechanical movements.

Fig. 11 shows the plungers in their relative positions when the compressing-plungers are on the point of entering the die, the compressing-plunger F' being shown just entering and the die being doubly locked. At this time the ejecting-plunger is nearly half-way through, so that although the die has been previously locked by the pawls this plunger doubly locks it previous to the other plungers entering.

Figure 6:
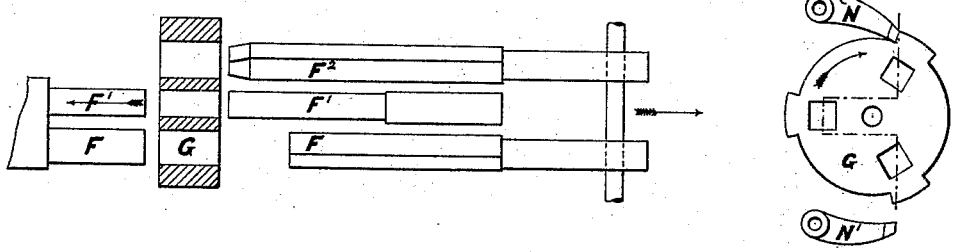
Figure 7:
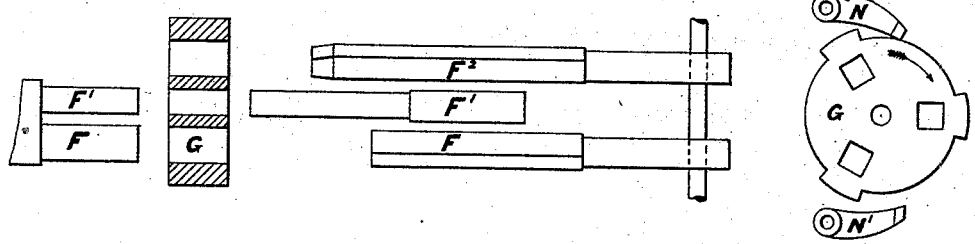
Figure 8:
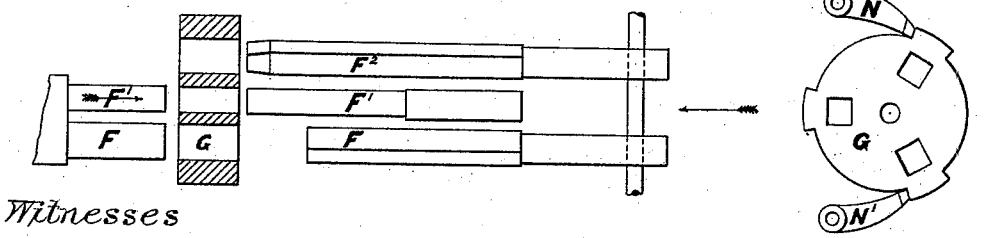
Figure 12:
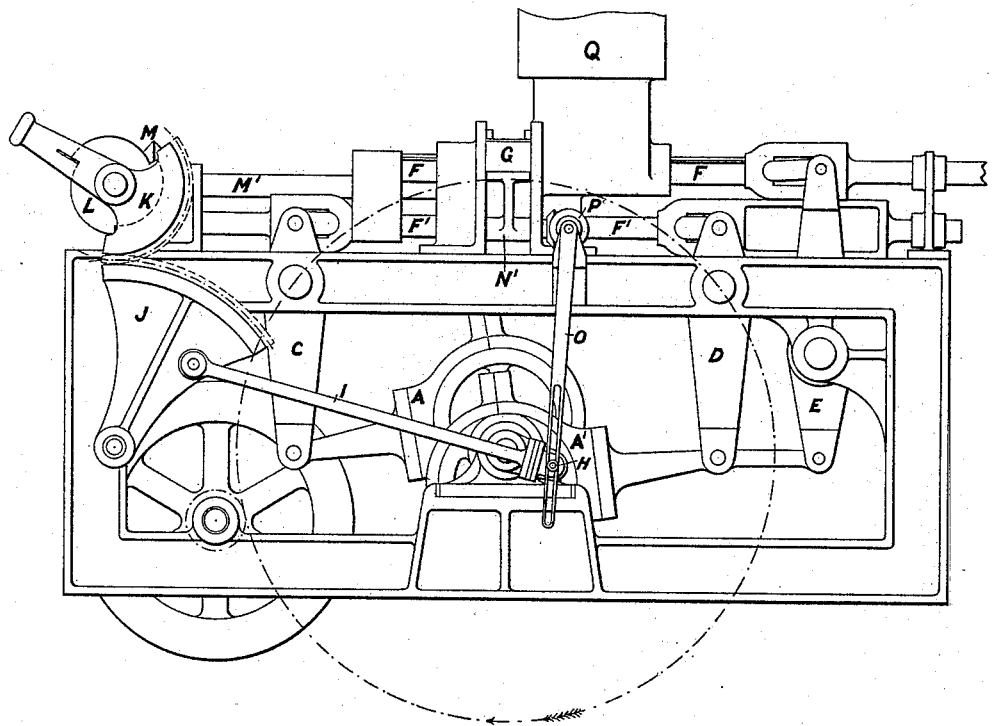
Fig. 12 shows the levers and plungers at half-stroke, the plungers having just receded out of their respective holes in the intermittent-revolving die G, this die just commencing to move, as shown in Figs. 6 and 14.
Figure 13:
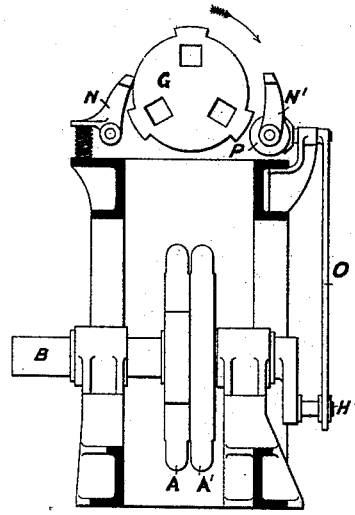
Fig. 13 shows the position of the pawl N' and the die G after another one-fourth of a revolution has taken place, as also shown and described in Fig. 7.
Figure 14:
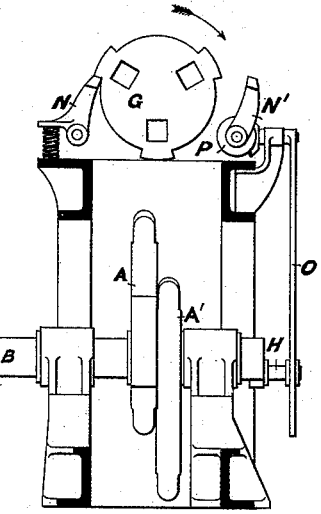

Fig. 14 shows the position of the pawl N' and the die G, the die commencing to move and pawl N' beginning to move inward, as shown in Figs. 6 and 12, so that at the end of the next half-stroke, as shown in Fig. 8, the die will have completed one of its intermittent rotary movements, and at the same instant the pawl will have completed its inward movement, abutting against one of the lugs, and so prevent any further forward movement of the die, and at the same time the pawl N on the other side itself drops in, and so, by means of another lug, prevents any rebound, thus locking the die in both directions before any of the plungers can enter their respective holes in it.

Figure 17:
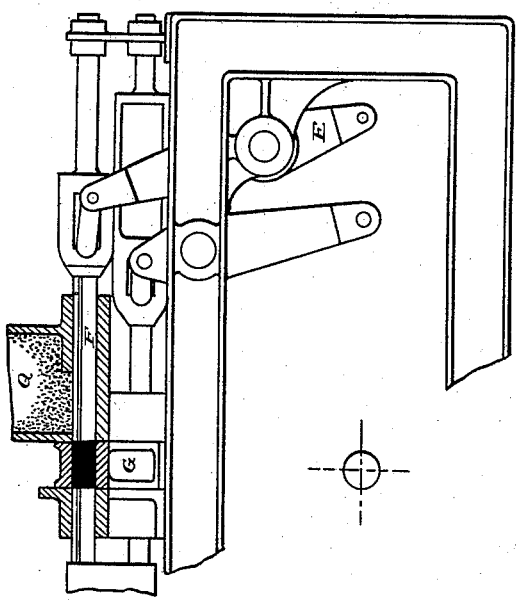
Figure 18:
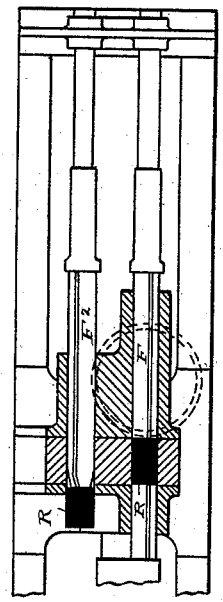
Figure 15:
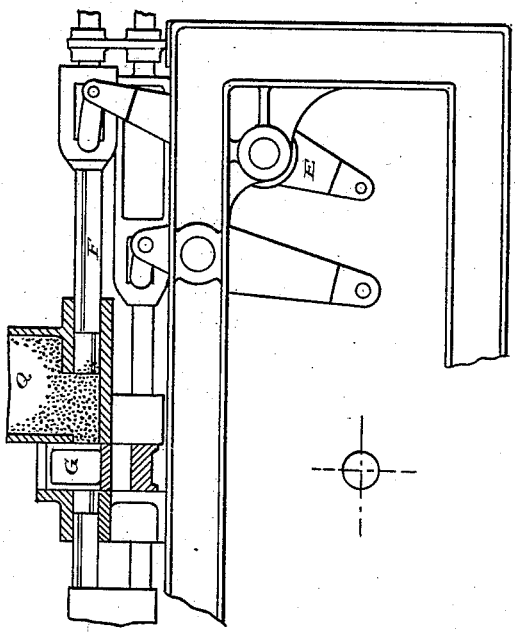
Figure 16:
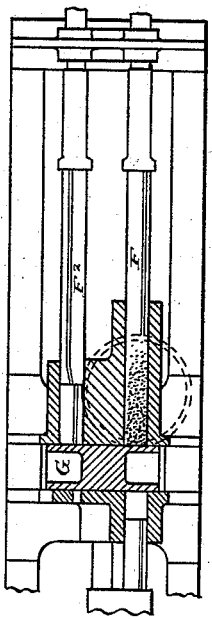

The method of filling in substances is as follows: Figs. 15 and 16 show the substance filled by gravity or otherwise into the space in the bottom of the hopper Q left by the receded filling-plunger F, the substance then being ready to be charged into the intermittent-revolving die G as soon as its intermittent movement is complete, and the empty hole (out of which a pellet has just been discharged) is by means of this movement brought exactly opposite this plunger. The completion of this movement of the die takes place when the lever E assumes a vertical position and is at half-stroke, as shown in Figs. 8 and 12. The lever operating the opposite plunger is now simply approaching the opposite end of the empty hole in the die to form an abutment for the substance to be filled again, as clearly shown in Figs. 8 and 12, and at this time the operation of filling commences—viz., the filling-plunger F is approaching the die, pushing before it the substance in the space at the bottom of the hopper Q into the empty hole in the die G. Figs. 17 and 18 show the filling-plunger F and its opposite abutment-plunger at their extreme inward stroke, the substance now being completely fitted into the hole in the die and partly compressed into the pellet R.

Figure 9:
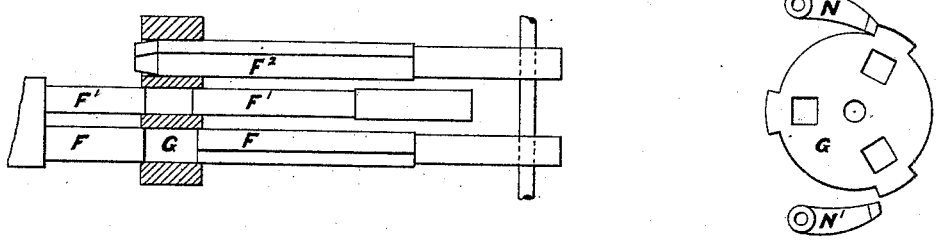
Figure 10:
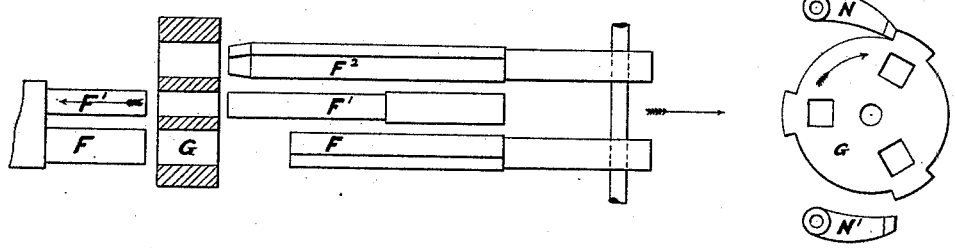
Figure 11:
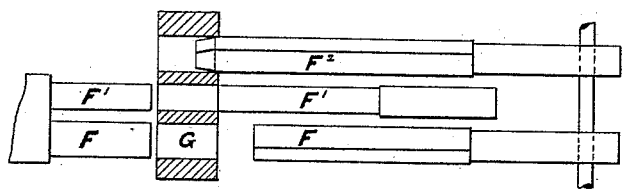

The *modus operandi* of discharging is as follows, referring particularly to Fig. 18. The ejecting-plunger $F^2$, being, as shown in Fig. 9, longer than the filling-plunger F, has now passed completely through the hole which contains the compressed pellet R and discharged it out of the die, as shown in Fig. 18, to be then received by the operator.

Figure 1:
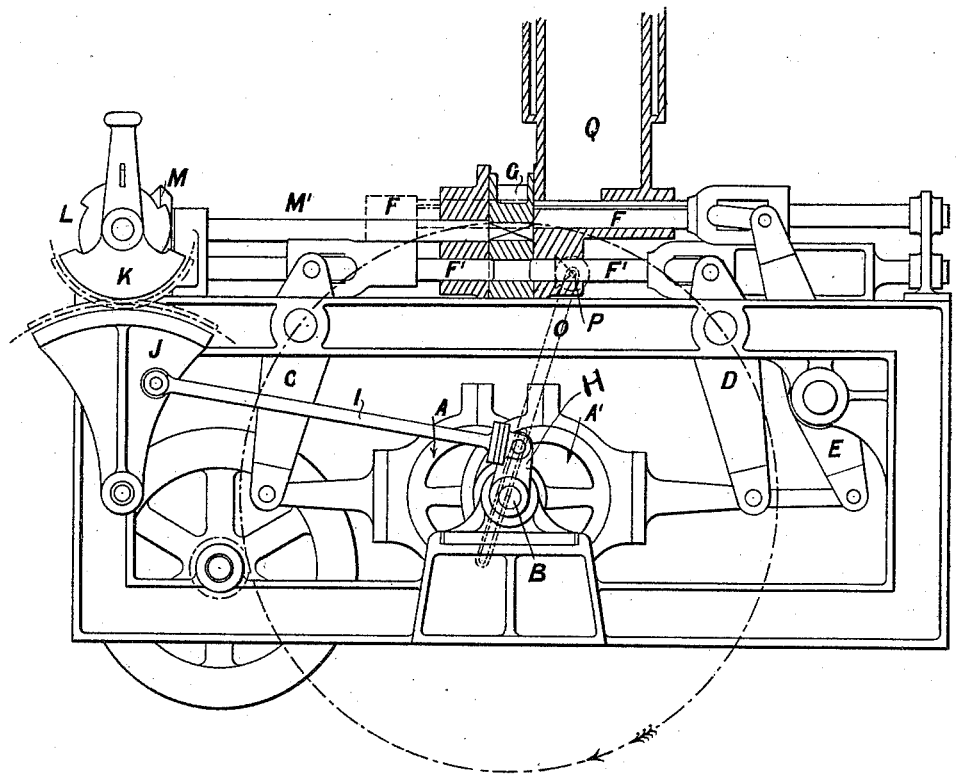
Figure 2:
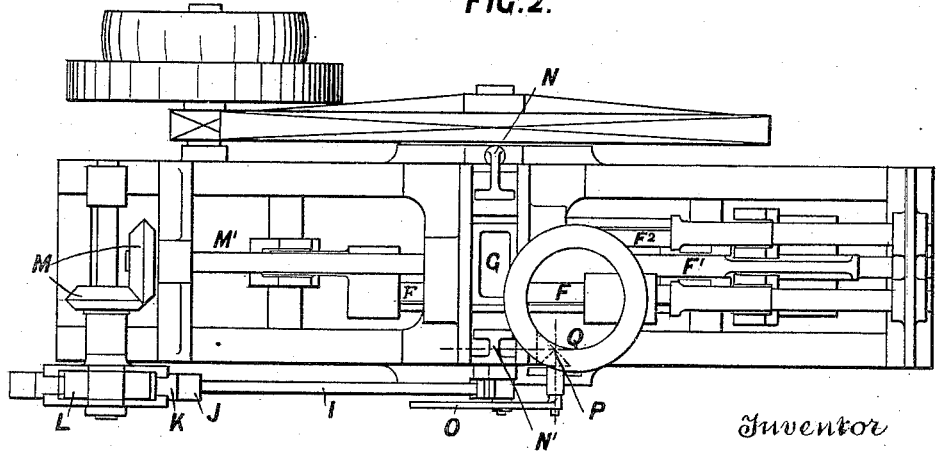
Figure 3:
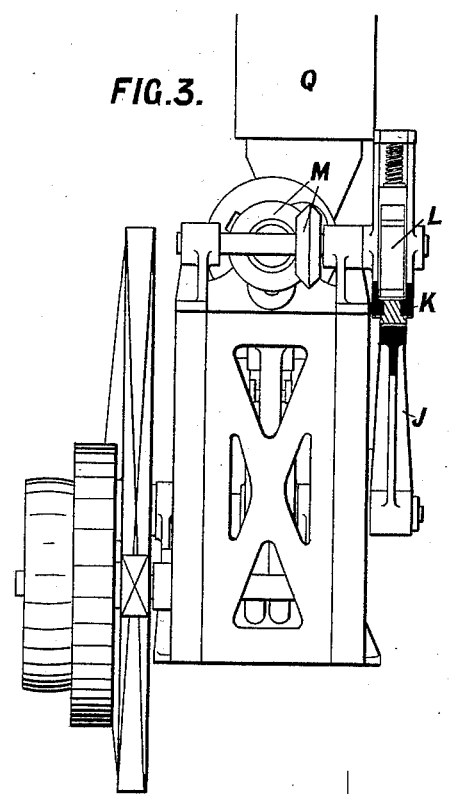
Figure 4:
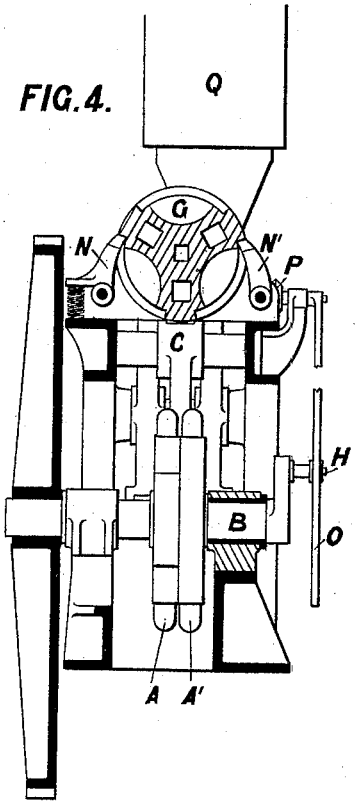
Figure 5:
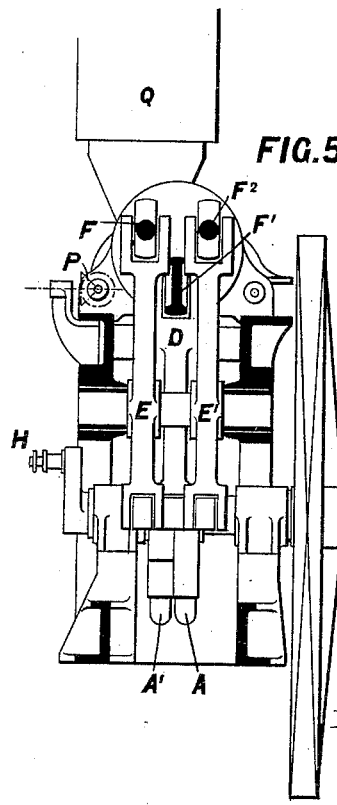

The *modus operandi* is as follows: The three operations of filling, compressing, and ejecting are effected simultaneously. The die G having just completed one of its intermittent rotary movements, and the pawl N' at that same instant being by its connections with the crank-pin H caused to approach to its nearest position to the die, as shown in Fig. 4, meets one of the lugs formed on the die and so locks the die on this side. At the same instant the other automatic pawl N is by means of its spring pushed into gear with another of these lugs on the other side of the revolving die, thus completely locking the die from the possibility of moving in either direction. At this time the two filling-plungers commence the work of compression. These filling-plungers have strokes of different length, the one on the filling end of the die, a long stroke to fill in the substance, while the other plunger F has only a short stroke. The plungers enter the die only a short distance, the short one acting as an abutment, against which the long filling-plunger forces the material. The short plunger F has the same length of stroke as the short compressing-plunger F', being coupled thereto by means of the cross-head, worked from the lever C. The compressing-plungers F' F' have a short stroke and enter the die at both ends with a great and infinitely-increasing pressure, completing the compression. The ejecting-plunger $F^2$, which has a long stroke, enters the die and ejects the compressed substance. This plunger is longer than the others, as it is required to pass completely through the die to do its duty. It therefore enters the die first and so assists to lock the die in position before the other plungers enter. Then, when the plungers have receded out of their respective holes in the die, the next intermittent rotary movement of this die takes place, bringing it into position for the respective operations to be again performed simultaneously—that is, the hole from which the pellet or other form of compressed substance was ejected comes into position opposite the filling-plungers, the hole in which the substance had been filled and partly compressed opposite the compressing-plungers, and the hole in which the substance had been compressed opposite the ejecting-plunger, &c., after each movement of the die, the three operations taking place simultaneously. The respective short reciprocating movements of the compressing-plungers and the longer reciprocating movements for the filling and ejecting plungers are obtained by means of the levers C, D, and E, which are coupled to the two opposite eccentrics A and A', as clearly shown in the drawings, the effect of this mechanical combination being that a great and infinitely-increasing pressure is obtained toward the end of the inward stroke of the plungers.

Having fully described my invention, what I desire to claim and secure by Letters Patent is—

1. In combination with the main shaft B, a die-carrying shaft, connections between the same for giving the die intermittent movement, plungers for acting upon the material in said die, a second set of connections between the main shaft and the plungers for operating the same, a pawl for locking the die-shaft in position, and a third set of operating-connections between said pawl and the main shaft, whereby upon the completion of the intermittent revolution of the die-shaft it is automatically locked, substantially as described.

2. In combination with the main shaft B, a die-carrying shaft, connections between the two for giving intermittent movement to the die, eccentrics on said shaft B, plungers for acting upon the material in the die, a lever C, connecting the plungers upon one end of the die with one of the eccentrics, levers D E E', connecting the other eccentric with the plungers upon the other side of the die, whereby the same length of movement is given the plungers upon one side of the die, but a different length to those on the other side of the die, and means for locking the die at the end of each movement, substantially as described.

3. In combination with the main shaft, a die-carrying shaft, a crank on the main shaft, and connections between said crank and the die-revolving shaft, for giving intermittent motion thereto, eccentrics on said main shaft, plungers upon either side of the die, and connections between the plungers and the respective eccentrics, a spring-pawl N, pivoted on the machine, adapted to engage with projections formed on the die, and a second pawl N', pivoted on the machine, and connections between said pawl and the crank on the main shaft, whereby the same is adapted to engage a projection on the die at the end of each movement, substantially as described.

THOMAS MESSENGER.

Witnesses:
SYDENHAM PAYN,
JOHN WATTS.